United States Patent [19]

Chen et al.

[11] 4,263,129
[45] Apr. 21, 1981

[54] HYDROTREATING/HYDROCRACKING PROCESS WITH LOW ACIDITY CATALYST

[75] Inventors: Nai Y. Chen, Titusville; David S. Shihabi, Pennington, both of N.J.

[73] Assignee: Mobil Oil Corporation, Fairfax, Va.

[21] Appl. No.: 71,979

[22] Filed: Sep. 4, 1979

[51] Int. Cl.$^3$ .................... C10G 11/05; C10G 47/20
[52] U.S. Cl. .................. 208/111; 208/DIG. 2; 208/120; 252/411 R; 252/455 Z
[58] Field of Search ............... 208/111, 120

[56] References Cited

U.S. PATENT DOCUMENTS

| | | | |
|---|---|---|---|
| Re. 29,857 | 12/1978 | Argauer et al. | 208/120 X |
| 3,700,585 | 10/1972 | Chen et al. | 208/111 |
| 3,702,886 | 11/1972 | Argauer et al. | 423/328 |
| 3,804,746 | 4/1974 | Chu | 208/111 |
| 3,890,218 | 6/1975 | Morrison | 208/135 |
| 3,899,544 | 8/1975 | Chang et al. | 585/408 |
| 4,165,275 | 8/1979 | Blanton et al. | 208/113 |

*Primary Examiner*—Herbert Levine
*Assistant Examiner*—G. E. Schmitkons
*Attorney, Agent, or Firm*—Charles A. Huggett; Charles J. Speciale

[57] ABSTRACT

Conversion of hydrocarbons is conducted over low acidity zeolites such as the sodium form of zeolite ZSM-5 to yield products like those produced by hydrocracking but with substantially decreased proportion of light hydrocarbons having one to four carbon atoms. (Sulfiding of sodium zeolites activates such sodium zeolites for the present purpose.) The hydrocarbon conversion is conducted with mixed-phase charge (Trickle mode) under hydrogen pressure or with liquid-phase charge in a liquid-full reactor.

19 Claims, 2 Drawing Figures

HYDROTREATING/HYDROCRACKING PROCESS WITH LOW ACIDITY CATALYST

BACKGROUND OF THE INVENTION

1. Field of the Invention

The invention is concerned with conversion of relatively heavy hydrocarbon streams to produce lower molecular weight materials from a portion or all of the charge. In a very broad sense of the term, such processes involve a "cracking" reaction in the sense that hydrocarbon or substituted hydrocarbon molecules are converted to reaction product of lower molecular weight.

2. Description of the Prior Art

The cracking may be of a general nature in that molecules are varied nature are converted, i.e., branched and straight chain aliphatics, naphthenes, aromatics, etc. The compounds so converted may also include other atoms in the molecule: metals, oxygen, sulfur and/or nitrogen. In particular processes, the intent may be to convert a certain class of compounds in order to modify a characteristic of the whole. Exemplary of the latter type of conversion is shape selective conversion of straight and slightly branched aliphatic compounds of 12 or more carbon atoms to reduce pour point, pumpability and/or viscosity of heavy fractions which contain these waxy constituents. The long carbon chain compounds tend to crystallize on cooling of the oil to an extent such that the oil will not flow, hence may not be pumped or transported by pipelines. The temperature at which such mixture will not flow is designated the "pour point", as determined by standarized test procedures.

The pour point problem can be overcome by techniques known in the art for removal of waxes or conversion of those compounds to other hydrocarbons which do not crystallize at ambient temperatures. An important method for so converting waxy hydrocarbons is shape selective cracking or hydrocracking utilizing principles described in U.S. Pat. No. 3,140,322 dated July 7, 1964. Zeolitic catalysts for selective conversions of wax described in the literature include such species as mordenite, with or without added metal to function as a hydrogenation catalyst.

Particularly effective catalysts for catalytic dewaxing include zeolite ZSM-5 and related porous crystalline aluminosilicates as described in U.S. Pat. No. Re. 28,398 (Chen et al.) dated Apr. 22, 1975. As described in that patent, drastic reductions in pour point are achieved by catalytic shape selective conversion of the wax content of heavy stocks with hydrogen in the presence of a dual-functional catalyst of a metal plus the hydrogen form of ZSM-5. The conversion of waxes is by scission of carbon to carbon bonds (cracking) and production of products of lower boiling point than the waxes. However, only minor conversion occurs in dewaxing. For example, Chen et al. describe hydrodewaxing of a full range shale oil having a pour point of +80° F. to yield a pumpable product of pour point at −15° F. The shift of materials from the fraction heavier than light fuel oil to lighter components was in the neighborhood of 9% conversion.

Among the less specialized techniques for producing products of lower molecular weight than the hydrocarbon charge stock are catalytic cracking and catalytic hydrocracking. Catalytic cracking involves contacting the heavy hydrocarbon charge with a porous acidic solid catalyst at elevated temperatures in the range of 850° to 1000° F. to yield the desired lower boiling liquid product of greater value than the liquid charge (e.g. motor gasoline) together with normally gaseous hydrocarbons and coke as by-products. Hydrocracking employs a porous acidic catalyst similar to that used in the catalytic cracking but associated with a hydrogenation component such as metals of Groups VI and VIII of the Periodic Table. An excess of hydrogen is supplied to the hydrocracking reactor under superatmospheric pressure at lower temperature than those characteristic of catalytic cracking, say about 650° F.

Since the introduction of zeolite catalysts as exemplified by U.S. Pat. No. 3,140,249, a large proportion of the capacity for catalytic cracking and hydrocracking has been converted to use of such highly active catalysts. The high activity zeolite catalysts are characterized by very low content of alkali metal. Sodium, for example, is present as a cation in synthetic faujasites by reason of their manufacture. Expensive ion exchange operations are carried out in the preparation of cracking and hydrocracking catalysts from synthetic faujasite to replace the sodium or other alkali metal by protons or poly-valent metal cations.

It has been recognized that such zeolites can function as catalysts when containing a moderate percentage of sodium. Thus Kimberlin and Gladrow U.S. Pat. No. Re. 26,188 exhibits data showing cracking activity of a faujasite from which only one-third of the sodium has been removed by ion exchange. The extremely high activity of such catalysts as zeolite ZSM-5 has been moderated for specialized purposes by using the zeolite in the partially sodium form. See, for example, U.S. Pat. No. 3,899,544.

Zeolite ZSM-5 preparation is described in U.S. Pat. No. 3,702,886 which also describes several processes in which the zeolite is an effective catalyst, including cracking and hydrocracking. That zeolite is shown to be prepared from a forming solution which contains organic cations, namely alkyl substituted ammonium cations. Those large organic cations then occupy cationic sites of the zeolite and block pores at least partially. The conventional method for removing the organic cations is to burn them out with air at elevated temperature, leaving a proton at the site previously occupied by the organic cation. Sodium, or other alkali metal, at other cationic sites may then be ion exchanged to provide protons or multivalent metals as desired to prepare catalysts for cracking, hydrocracking and other purposes.

Regardless of the type of catalyst used, the principal products desired in cracking, hydrocracking and like processes for reducing molecular weight of hydrocarbon fractions are relatively low-boiling liquids such as motor gasoline, diesel fuel, jet fuel, No. 2 fuel oil and the like. Gaseous products such as hydrogen, methane, ethane, propane, etc. represent degradation of a portion of the charge to less valuable fuels than the desired premium products. In addition to being less valuable fuels, these gases require high proportions of hydrogen which can only deprive premium liquid products of hydrogen needed for their constitution.

SUMMARY OF THE INVENTION

In accordance with this invention the proportion of charge converted to gaseous by-products is reduced by employing a catalyst in which the active cracking ingredients is a low acidity form of a zeolite having a silica/alumina ratio above 12 and preferably also having a constraint index between about 1 and 12, such as zeolite ZSM-5. In preferred embodiments, the low acidity is achieved by using the sodium form of a zeolite typified by zeolite ZSM-5.

BRIEF DESCRIPTION OF THE DRAWINGS

These advantageous results are accomplished by use of conversion apparatus illustrated diagrammatically in the annexed drawings wherein.

DESCRIPTION OF PREFERRED EMBODIMENTS

Figure 1:
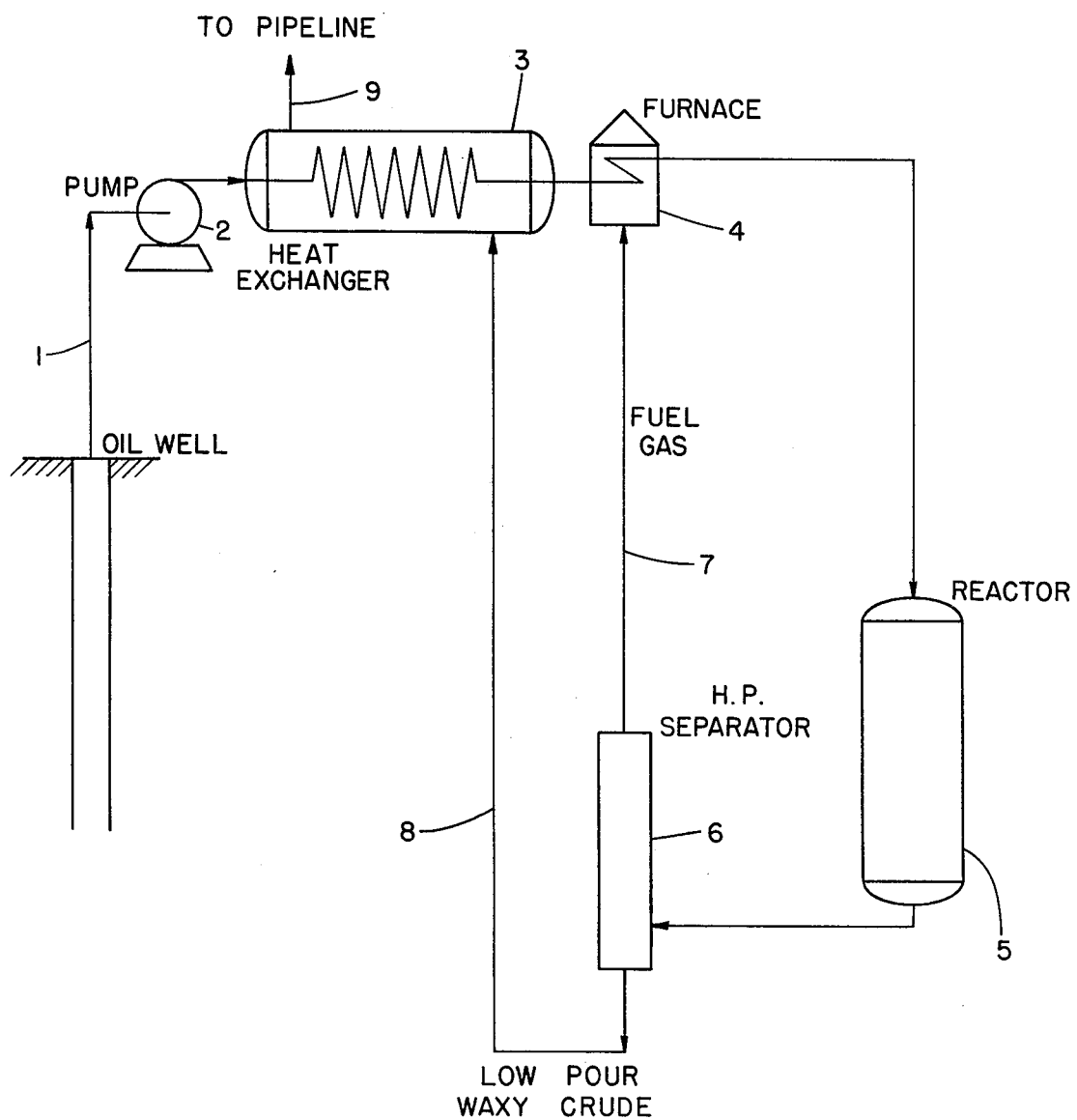
FIG. 1 is a typical flow diagram of the process as adapted for use in an oil field and FIG. 2 represents a modification in which hydrogen is circulated through the reactor.

As shown in the drawing, one preferred use of the invention is for conversion of waxy crude petroleum in the field to provide a product suitable for transmission by pipeline. Crudes of high pour point are not suited to pipeline transportation because they cannot be pumped and will not flow in pipes at temperatures below the pour point, which may be 50° F. or higher.

Although the concept of reducing pour point of waxy crude oil is not new, the utilization of the newly discovered characteristics of alkali metal exchanged ZSM-5 in a simple on site catalytic processing unit provides advantages not previously available.

Waxy crude oils are found in Utah, Indonesia, Australia, Libya and China. The production of waxy crude oil in China alone exceeds 1 million barrels a day. Transportation of waxy crude oils requires special considerations including the use of heated tank cars and heavily insulated and heated pipelines. The present invention provides an alternate means of solving the transportation problem by installing on the production site simple catalytic processing units which convert the waxy crude oil to a pipelineable oil. The system is made feasible by the discovery of novel catalyst compositions which do not require elaborate and expensive equipment to operate. It's estimated that for an average well producing 500 barrels a day, the catalytic reactor required measures only 3 ft. in diameter by 15 ft. long. Thus it would be economically feasible to install, for example 2000 such units in the field to process a million barrels a day of waxy crude oil. Alternatively, larger units may be built for a cluster of wells. It is also contemplated that these crude processing units be built on a portable stand so that they could be prefabricated and moved to the production site.

Waxy crude oils are generally high in hydrogen, low in sulfur and metal contaminants. However, these desirable characteritics are at present counterbalanced by their transportation problems associated with their high pour point. The invention solves the transportation problem at a reasonably low cost and therefore leads to wider distribution of waxy crude oils around the world.

The embodiment shown in the drawing utilizes alkali metal exchanged ZSM-5, including NaZSM-5, in a simple reactor system to be installed near the producing well to convert heavy waxy crude oil to pipelineable crude.

The catalyst is unique in its resistance to metals, hydrogen and sulfur, and can be used in the absence of hydrogen without experiencing rapid deactivation problems. Unlike H-ZSM-5 with or without hydrogenation metal function, alkali metal exchanged ZSM-5's reduce pour point and viscosity of waxy crude oils without forming any appreciabe $C_3^-$ gaseous products, so that the liquid recovery of the crude processed is 98% or better. In this embodiment, the process is carried out preferably in the liquid phase at 750 psig pressure and at temperatures below about 800° F.

Referring now to FIG. 1 of the annexed drawings, waxy petroleum from producing well passes at formation temperature by line 1 to a pump 2 which discharges to the tubes of a heat exchanger 3 to be preheated by exchange against the product of the process. The preheated waxy crude passes from heat exchanger 3 to furnace 4 where it it heated further to a temperature suitable for the desired conversion. The heated charge is introduced to reactor 5 for conversion in the presence of the low acidity zeolite catalyst under conditions presently to be described. It will be noted that the conversion in this embodiment takes place without added hydrogen, a material difficult to provide at field installations.

Products of the reaction, constituted by low pour point crude with a small amount of gaseous hydrocarbons, are transferred to a high pressure separator 6 from which gaseous hydrocarbons of 1-4 carbon atoms are withdrawn and supplied by line 7 as fuel to the furnace 4. The low pour point liquid product of the conversion in reactor 5 is transferred by line 8 to the shell side of heat exchanger 3 where it is cooled by supplying preheat to the incoming charge as above described. The cooled product flowing by line 9 from the shell side of heat exchanger 3 is a low pour point liquid petroleum suited to transport by pipeline.

Figure 2:
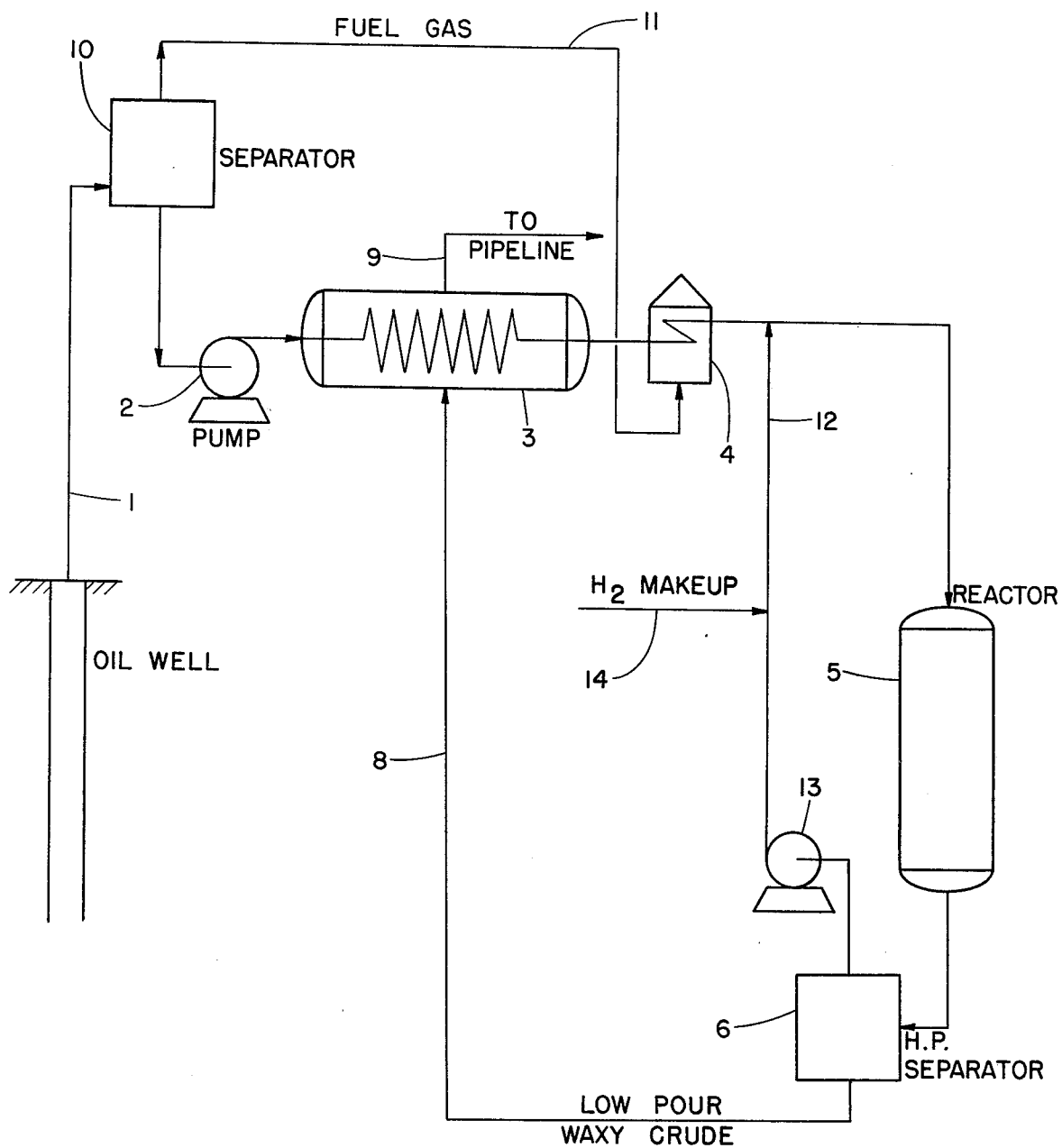

The flow according to the diagram of FIG. 2 is very similar, but with appropriate modification for circulation of hydrogen with the crude in reactor 5. Crude petroleum from the producing well or wells is passed by line 1 to a field separator 10 from which dissolved gases are taken off by line 11 and supplied as fuel to furnace 4. The liquid oil phase from separator 10 is then propelled by pump 2 through heat exchanger 3 and furnace 4 to reactor 5. Hydrogen gas is added to the heated crude petroleum stream from recycle line 12 between furnaces 4 and reactor 5. As before, the reaction product from reactor 5 is transferred to high pressure separator 6 from which low pour point waxy crude oil passes by line 8 through heat exchanger 3 for cooling by giving up sensible heat to the incoming charge. The cooled low pour point crude then passes by line 9 to a suitable pipeline. The vapor phase from high pressure separator 6 is constituted primarily by elemental hydrogen for recycle by line 12 following compression in pump 13. Make-up hydrogen as needed is supplied by line 14.

The Catalyst

The catalyst used in the present invention is a low acidity form of a class of zeolites which have been found to be extremely active in the acid form. In that form the cationic sites are occupied by protons introduced by ion exchange with an acid or an ammonium (including substituted ammonium) cation which is then decomposed by heat to a proton. Alternatively, at least a portion of the cationic sites may be occupied by polyvalent metals. For use in the present invention, these very high acidities inherent in zeolites such as zeolite ZSM-5 are drastically reduced. Preferably, the acidity is reduced by extensive ion exchange with sodium or other alkali metal. The invention may also be practiced with such zeolites of very high silica/alumina ratio or by steaming of the active form of the zeolite. It will be recognized by those skilled in the art of zeolite catalysis that substitution of sodium or like cation and steaming are generally recognized as means to "poison" a zeolite catalyst by severely impairing its activity. These agencies are generally avoided in preparation and use of zeolite catalysts in cracking or hydrocracking.

The acid activity of zeolite catalysts is conveniently defined by the alpha scale described in an article published in Journal of Catalysis, Vol. VI, pp 278–287 (1966). The alpha scale so described will be used herein to define activity levels.

In general, the catalysts used in accordance with this invention are crystalline zeolites having a silica/alumina ratio greater than 12. Preferably the zeolite catalyst has a Constraint Index (C.I.) between about 1 and about 12.

Zeolites characterized by such constraint indices induce profound transformations of aliphatic hydrocarbons to aromatic hydrocarbons in commerically desirable yields and are generally highly effective in conversion reactions involving aromatic hydrocarbons. These zeolites retain a degree of crystallinity for long periods in spite of the presence of steam at high temperature which induces irreversible collapse of the framework or other zeolites, e.g. of the X and A type. Furthermore, carbonaceous deposits when formed, may be removed by burning at higher than usual temperatures to restore activity. In many environments the zeolites of this class exhibit very low coke forming capability, conducive to very long times on stream between burning regenerations.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline alluminosilicate, the oxygen atoms themselves being bonded to the silicon or aluminum atoms at the centers of the tetrahedra. Briefly, the preferred type zeolites useful in this invention possess a silica to alumina mole ratio of at least about 12 preferably in combination with a structure providing constrained access to the crystalline free space.

The zeolite will have a silica/alumina ratio greater than 12. In one embodiment, the desired low acid activity of the catalyst is achieved by unusually high silica/alumina ratio, greater than 1000, preferably upwards of about 1500.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Such zeolites, after activation, acquire an intracrystalline sorption capacity for normal hexane which is greater than that for water, i.e. they exhibit "hydrophobic" properties. It is believed that this hydrophobic character is advantageous in the present invention.

The type zeolites described freely sorb normal hexane and have a pore dimensions greater than about 5 Angstroms. In addition, the structure will preferably provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the constrained type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exists such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methyl pentane remaining})}$$

The constraint index approximates the ratio of the cracking rate constants for the two hydrocarbons. Preferred zeolites for the present invention are those having a constraint index in the approximate range of 1 to 12. Constraint Index (CI) values for some typical zeolites are:

| ZEOLITE | C.I. |
|---|---|
| ZSM-5 | 8.3 |
| ZSM-11 | 8.7 |
| ZSM-12 | 2 |
| ZSM-38 | 2 |
| ZSM-35 | 4.5 |
| TMA Offretite | 3.7 |
| Beta | 0.6 |
| ZSM-4 | 0.5 |
| H-Zeolon | 0.4 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperatures employed within the aforenoted range of 550° F. to 950° F., with accompanying conversion between 10% and 60%, the constraint index may vary within the indicated approximate range of 1 to 12. Likewise, other variations such as the crystal size of the zeolite, the presence of possible occluded containants and binders immediately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with probability, in some instances, of compounding variables extremes.

While the above experimental procedure will enable one to achieve the desired overall conversion of 10 to 60% for most catalyst samples and represents preferred conditions, it may occassionally be necessary to use somewhat more severe conditions for samples of very low acid activity, such as those having a very high silica to alumina ratio. In those instances, a temperature of up to about 1000° F. and a liquid hourly space velocity of less than one, such as 0.1 or less, can be employed in order to achieve a minimum total conversion of about 10%.

The preferred class of zeolites defined herein exemplified by ZSM-5, ZSM-11, ZSM-12, ZSM-35, ZSM-38 and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

In addition to those zeolites, the invention in its broader aspects of zeolites having a silica/alumina ratio above 12 also contemplates such zeolites as Beta, decribed in U.S. Pat. No. Re. 28,341.

The specific zeolites described, when prepared in the presence of organic cations, are catalytically inactive possibly because the intracrystalline free space is occupied by organic cations from the forming solution. They may be activated by heating in an inert atmosphere at 1000° F. for one hour, for example followed by base exchange with ammonium salts followed by calcination at 1000° F. in air. The presence of organic cations in the forming solution may not be absolutely essential to the formation of this type zeolite; however, the presence of these cations does appear to favor the formation of this special type of zeolite. More generally in most applications it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, alumina extraction and calcination, in combinations. Natural minerals which may be so treated include ferrierite, brewsterite, stilbite, dachiardite, epistilbite, heulandite, and clinoptilolite. The preferred crystalline aluminosilicate are ZSM-5, ZSM-11, ZSM-12, ZSM-35, and ZSM-38, with ZSM-5 particularly preferred.

In a preferred aspect of this invention, the zeolites hereof are selected as those having a crystal framework density, in the dry hydrogen form, of not substantially below about 1.6 grams per cubic centimeter. It has been found that zeolites which satisfy all three of these criteria are most desired. Therefore, the preferred zeolites of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pykometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dacchiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite of low acid activity by reason of very high silica/alumina ratio or steaming is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable ions of Groups IB to VIII of the Periodic Table, including, by way of example, calcium or rare earth metals.

The zeolites used according to the invention have low alpha values, less than about 10. Preferably, the alpha value is substantially lower than unity. As noted, the low acid activity may be achieved by using zeolites of very high silica/alumina ratio or by severe high temperature steaming of zeolites having lower silica/alumina ratio, for example zeolite ZSM-5 of ratio 40 may be treated with 100% steam at 1200° F. for a period of time (several hours) adequate to reduce the acid activity to the necessary level.

Preferably, the low acidity is achieved by extensive ion exchange of the zeolite with sodium or other alkali metal cation. Silica/alumina ratios in the range of 12 to aluminum free will generally characterize the zeolites preferred in this form of the invention. Particularly preferred zeolites may be in the range of 20-2000 It is found that the sodium forms of the zeolites are less effecient for dewaxing than are the acid forms but give better overall results measured as conversion, particularly since the conversion products are low in gaseous hydrocarbons.

Sodium content of the zeolites will vary inversely with the silica/alumina ratio since it is the aluminum atoms which provide cationic sites suitable for acceptance of the alkali metal ion. Depending on that ratio, sodium content may vary between 0.4 and 5.2 weight percent of the metal, with preferred sodium contents ranging between 0.75 and 3.4 weight % sodium as metal. Content of the other alkali metals will vary from those numbers on a weight basis in proportion to atomic weights. The alkali metal content generally can be expressed as 0.17 to 2.26, preferably 0.33 to 1.50 milliequivalents per gram. Sodium content in excess of satisfying cationic sites is considered desirable. The reason is not clearly understood. For example, ZSM-5 containing about 40 ppm of Al and 1% Na is a very good catalyst.

In preferred forms of the invention, the zeolite contains no hydrogenation metal component, although hydrogen is preferably mixed with the charge when the mixed phase trickle mode of contact is employed. However, the invention contemplates catalyst blends in which the zeolite serves as a matrix for finally divided hydrotreating catalyst of conventional nature. Such hydrotreating catalysts are hydrogenation metal catalyst such as cobalt-molybdenum or nickel-tungsten on a porous alumina support. These composites are prepared by thorough mixing of a major proportion of sodium zeolite and a minor porportion of hydrotreating catalyst followed by pelleting of the blend.

The low acidity alkali metal zeolites are prepared by ion exchange of the zeolite with an aqueous solution of an alkali metal salt or hydroxide at high pH values. In the following example, care was taken to assure complete ion exchange. Thus the observed activity appears truly representative of a non-acidic zeolite.

EXAMPLE 1

Sodium ZSM-5 was prepared by the addition of 3.0 gms of 14-30 mesh NH$_4$ZSM-5 at room temperature to 150 ml of 0.2 N NaCl solution having a pH of 10.0 (pH adjusted with 0.1 N NaOH.) The mixture was maintained at room temperature for 48 hours with occasional agitation by swirling to avoid particle breakage. The pH of the solution was monitored frequently and adjusted to 10.0 with 0.1 N NaOH as required. Before overnight contact, the pH was adjusted to 11.0. After 48 hours, the liquid was decanted and replaced with 150 ml of fresh NaCl/NaOH solution. The exchange was completed by 53 hours as judged by the constancy of the pH. The catalyst was washed with 150 ml of dilute NaOH (pH=10) solution and dried at 130° C.

EXAMPLE 2

A further batch of NaZSM-5 was prepared in the same manner as in Example 1, except that 30 gms of powdered sample of a large crystal ZSM-5 was used. The sample was added to 1500 ml of 0.3 N alkaline NaCl solution and a magnetic stirrer was used to assure good mixing. As in the previous example the pH was used to monitor the exchange and adjustment was necessary every few hours with sodium hydroxide to maintain an alkaline pH in the range of 10-11. The constancy of pH over a 24-48 hours period was used as the criterion to terminate the exchange. Using this approach, large crystal ZSM-5 was prepared with total exchange time of one week. The finished sample was fully exchanged as indicated by the atomic ratio of Na/Al shown in Table 1.

EXAMPLE 3

Cesium ZSM-5 was prepared by ion exchanging 15 gms of 14/30 mesh NH$_4$ZSM-5 with 430 ml 1 M CsCl at room temperature. Two exchanges were made with pH in the range 10-11 adjusted with a dilute solution of CsOH. As in the case of Example 1, the finished catalyst was washed only once after the second exchange with aqueous CsOH solution of pH=10-11 and dried at 130° C. The finished sample was fully exchanged as indicated by the elemental analysis shown in Table 1.

TABLE 1

| Compositional Analyses of Alkali Metal Exchanged ZSM-5 | | |
|---|---|---|
| | NaZSM-5 (Example 2) | CsZSM-5 (Example 3) |
| Composition, wt% | | |
| M(Na or Cs) | 1.02 | 12.0 |
| SiO$_2$ | 87.75 | 74.85 |
| Al$_2$O$_3$ | 2.05 | 3.58 |
| Ash | 96.36 | 94.15 |
| SiO$_2$/Al$_2$O$_3$ | 73 | 36 |
| M$^+$/Al | 1.1 | 1.3 |

The residual acid activity of the alkali metal zeolite was measured in two ways: (1) the standard alpha test and (2) hexene-1 isomerization test. The latter test is particularly useful for rating low acid activity catalysts with alpha values below 1. The test was carried out at 800° F. using a 5.3 mol ratio of He and hexene-1, flowing at 20-300 cc/min over 2 to 100 mg of catalysts mixed with 1 cc 30/60 mesh Vycor (HF treated and air calcined) depending on activity. For a catalyst of 1 alpha, the corresponding rating based on the hexene-1 test would be 1800.

TABLE 2

| Residual Acid Activity of Alkali Metal Exchanged ZSM-5 | | |
|---|---|---|
| Catalyst | Alpha | Hexene-1 |
| Ex. 1 NaZSM-5 | 0.05 | — |
| Ex. 2 NaZSM-5 | 0.06 | |
| Ex. 2 NaZSM-5 | 9 × 10$^{-3}$* | 16 |
| Ex. 3 CsZSM-5 | 0.05 | — |
| Ex. 3 CsZSM-5 | 44 × 10$^{-3}$* | 8 |

TABLE 2-continued

| Catalyst | Residual Acid Activity of Alkali Metal Exchanged ZSM-5 | |
|---|---|---|
| | Alpha | Hexene-1 |
| Vycor | $3 \times 10^{-5}$* | 0.05 |

*Calculated value $1 = 1800 \, k_{hexene-1}$

The combination of zeolites described above with hydrotreating catalysts offers unique processing advantages. It is shown below that low acidity ZSM-5 such as NaZSM-5 is an effective hydrocarbon conversion catalyst which is non-aging, resistant to nitrogen and sulfur compounds in the feedstock. Furthermore, NaZSM-5 was found to have no demetalation activity at all, i.e., nickel and vanadium compounds present in resids and heavy oils do not react over NaZSM-5 and pass through the catalyst bed unaltered. Thus it is an ideal support matrix for the micron size demetalation/hydrotreating catalyst by providing open channels for the resid molecules to reach the hydrotreating demetalation sites throughout a catalyst particle and at the same time provide shape selective conversion capabilities to upgrade heavy oils to naphtha and low pour point distillates.

Because of the upgrading capability and the fine dispersion of the demetalation/hydrotreating component, the catalyst is effective at a lower hydrogen pressure than that is required by conventional resid hydrotreating catalysts. Instead of operating at 2000–3500 psig, as do most resid hydrotreating processes, the operating pressure can be reduced to below 1500 psig with the composite catalyst.

The novel catalyst compositions can therefore reduce the cost of upgrading resids and heavy oils. Significant savings in capital investment and operating cost can be realized by virtue of the low pressure requirement, long operating cycles and the regenerability of the catalyst. Additional benefits in the uplift of product value are also contemplated.

Process Conditions

The alkali metal zeolites of this invention are utilized under conditions similar to those employed in conventional hydrocracking although the zeolite catalyst does not contain a hydrogenation component as do true hydrocracking catalysts. The conversion with the present catalyst is generally similar to that seen in hydrocracking with one very important difference, namely a highly advantageous low yield of gaseous hydrocarbons. That advantage is enhanced by a characteristically long on-stream life of the catalyst.

Sulfur appears to activate these catalysts for conversion of gas oils, whole crudes, residual stocks, lubricating oil fractions, shale oils, bitumens and heavy hydrocarbon charge stocks generally. Such mixtures generally contain sulfur and an induction period is generally observed in the range of about 24 to 48 hours to reach full activity of the catalyst. Alternatively, the catalyst may be presulfided by treatment with hydrogen sulfide at about reaction temperature to avoid the induction period. Not wishing to be bound by theory, it is thought that sulfur in the feedstock provides an added beneficial effect for the operation of this class of catalysts.

For installations having hydrogen available, it is preferred to operate the process under hydrogen pressure by the trickle technique with hydrogen flowing concurrently downward with mixed vapor and liquid phase hydrocarbons. In the absence of hydrogen, the process is preferably operated with a liquid-full reactor under sufficient pressure to maintain the hydrocarbons in the liquid phase.

Temperature of the reaction is between 650° F. and 850° F., preferably between 700° F. and 800° F. Activity of the catalyst drops off below about 700° F., making it advisable to operate at a temperature above that level. Many charge stocks will undergo some thermal cracking at temperatures above about 800° F. with resultant production of undesired gaseous hydrocarbons thereby losing one advantage of the invention to the extent that thermal cracking takes place.

Pressures employed will vary according to the technique being used. For liquid full reactor operation, the minimum pressure will be that necessary to maintain the charge in liquid phase at the temperature of reaction. In any event, the pressure will be above about 200 psi. There appears to be no maximum pressure limit imposed by effectiveness of the catalyst, but costs for capital installation and operation of compressors and the like rise rapidly for pressures in excess of 2000 psi. It is preferred to operate below that level for economic reasons.

Space velocity will vary somewhat with sulfur content of the charge, permitting higher space velocity as sulfur increases above 0.5 wt.% to upwards of about 5.0 wt.%. In general, space velocity will range from about 0.1 liquid volume of hydrocarbon charge per volume of catalyst per hour (LHSV) up to 5.0 LHSV. For most charge stocks, preferable LHSV will range from about 0.3 to 1.0.

EXAMPLE 4

Conversion of heavy vacuum gas oil

Heavy vacuum gas oil from Arab light crude (boiling range 800°–1070° F.) was converted at 750 psig over sodium ZSM-5 prepared in the manner described above. During the operation hydrogen was introduced to the reactor with the charge at a rate corresponding to about 4000 standard cubic feet of hydrogen per barrel of feed. For purposes of comparison a run was made at the same pressure and hydrogen circulation, using a zinc palladium ZSM-5 which had an alpha rating above 150 as compared with alpha of less than 0.1 for the sodium zeolite. Conversion and product distribution data are shown in Table 3.

TABLE 3

| Catalyst | NaZSM-5 | ZnPdZSM-5 |
|---|---|---|
| Temp°F. | 740 | 795 |
| LHSV | 0.5 | 0.5 |
| Conversion, wt% | 48.1 | 51.0 |
| Products, wt% | | |
| $C_1 + C_2$'s | 0.1 | 2.2 |
| $C_3 + C_4$ | 2.6 | 15.7 |
| $C_5$-420° F. | 21.0 | 14.5 |
| 420–800° F. | 24.4 | 18.6 |
| 800° F.+ | 51.9 | 49.0 |

NaZSM-5 is unexpectedly more active than ZnPdZSM-5 as indicated by the 45° F. lower reaction temperature required to achieve similar conversion. Also noted was that $C_4^-$ products represent 5.6% and 35.1% for the low acidity catalysts and ZnPdZSM-5 respectively. The major shift in $C_4^-$ yield was most unexpected. The NaZSM-5 catalyst was run for one month without increase in temperature. The run was terminated while the catalyst was still active.

EXAMPLE 5

Conversion of atmospheric resid

Atmospheric residuum from Arab light crude was converted over cesium ZSM-5 and a comparable run was conducted over palladium ZSM-5. The latter catalyst was extrudate of 35 wt% alumina binder with 65 wt.% ZSM-5 of 70 silica/alumina ratio containing 0.5 wt.% of Pd. Inspection data of the charge are shown in Table 4.

TABLE 4

Properties of Arab light atmospheric resid

| | |
|---|---|
| Analysis, Elemental, % | |
| Arsenic | .009 |
| Carbon | 84.88 |
| Hydrogen | 11.24 |
| Nickel, ppm | 11 |
| Nitrogen | .17 |
| Sulfur | 3.17 |
| Vanadium, ppm | 36 |
| Ash from Petroleum, % | 0.1 |
| Carbon Resid, Conradson, % | 7.84 |
| Distillation, °F. | |
| 5% | 680 |
| 10% | 720 |
| 30 | 820 |
| 50 | 935 |
| 60 | 990 |
| Gravity, API | 16.9 |
| Gravity, Specific, 60° F. | .9535 |
| Molecular Weight, vp lowering | 523 |
| Pour Point, °F. | 50 |
| Viscosity, KV 130° F. | 152.9 |
| Viscosity, KV 212° F. | 22.52 |

Conditions of reaction and conversion products are set out in Table 5.

TABLE 5

Conversion of Arab light atmospheric resid

| | Catalyst | |
|---|---|---|
| | CsZSM-5 | PdZSM-5 |
| Pressure | 750 | 1250 |
| Temperature | 775 | 776 |
| LHSV | 0.5 | 0.5 |
| Reactor Effluent Composition, wt% | | |
| $C_1$ | 0.3 | 0.5 |
| $C_2$ | 0.3 | 1.2 |
| $C_3$ | 0.6 | 6.2 |
| $C_4$ | 0.9 | 5.4 |
| $C_5$–420 | 7.4 | 5.9 |
| 420–650 | 9.1 | 6.2 |
| 650–800 | 27.3 | 23.8 |
| 800–1000 | 22.5 | 16.9 |
| 1000+ | 31.2 | 34.2 |

Again the most striking difference between these two catalysts is in the yields of $C_4^-$ products. Compared to PdZSM-5, CsZSM-5 produced less $C_4^-$ and more naphtha and low pour point distillate from the resid.

EXAMPLE 6

Conversion of waxy raffinate

Sodium ZSM-5 as above defined was compared with the hydrogen form of a 70 silica/alumina ZSM-5 as extrudate with 35 wt.% alumina binder. Charge in the comparative runs was a furfural raffinate from Arab light boiling above 650° F. Inspection data on that charge are shown in Table 6.

TABLE 6

Inspection data on Arab light waxy raffinate

| | |
|---|---|
| Gravity, °API | 29.1 |
| Gravity, Specific 60° F. | 0.8000 |
| Pour Point, °F. | 115 |
| KV 130° F. Centistokes | 38.47 |
| KV 210° F. Centistokes | 9.91 |
| SUS 130° F. Seconds | 181.1 |
| SUS 210° F. Seconds | 58.9 |
| Color, ASTM | — |
| Carbon Residue, % wt (RCR) | 0.13 |
| Hydrogen, %wt | 13.78 |
| Sulfur, %wt | 0.80 |
| Nitrogen, %wt | 0.0053 |
| Refractive Index 70° C. | 1.46466 |
| Aniline Point, °F. | 239.4 |
| Distillation | |
| IBP, °F. | |
| 5 | 678 |
| 10 | 851 |
| 30 | 870 |
| 50 | 885 |
| 70 | 908 |
| 90 | 925 |
| 95 | 950 |
| | 960 |

Reaction conditions and results obtained in the comparable runs are shown in Table 7.

TABLE 7

Conversion of waxy raffinate

| | Catalyst | |
|---|---|---|
| | NaZSM-5 | HZSM-5 |
| Pressure psig | 750 | 400 |
| Temperature | 790 | 750 |
| LHSV | 0.5 | 1.0 |
| H₂ SCF/Bbl | 4900 | 2500 |
| Yield | | |
| $C_1$ | 0.3 | 1.0 |
| $C_2$ | 0.6 | 1.7 |
| $C_3$ | 3.3 | 9.9 |
| $C_4$ | 4.8 | 9.1 |
| $C_5$ | 4.0 | 1.8 |
| $C_6$–650° F. | 34.6 | 3.3 |
| 650° F.+ | 51.0 | 73.3 |
| Pour Point, °F. | 35 | 5 |
| Viscosity | | |
| 100° F. | 48.9 | 110.3 |
| 210° F. | 6.7 | 11 |
| VI | 99.4 | 90.3 |

We claim:

1. A process for converting a high boiling hydrocarbon charge fraction to liquid products of lower boiling range which comprises contacting said charge fraction with a crystalline zeolite characterized by a silica/alumina ratio greater than 12, a constraint index between about 1 and about 12 and an acid activity measured by the alpha scale less than 10, said contacting being conducted at 650° to 850° F., space velocity of 0.1 to 5.0 LHSV and a pressure not less than about 200 psi.

2. A process according to claim 1 wherein the ion exchange sites of said zeolite are essentially occupied by alkali metal cations.

3. A process according to claim 2 wherein at least 0.5 weight percent of sulfur is included in the charge supplied to said contacting.

4. A process according to claims 2 or 3 wherein said alkali metal is sodium.

5. A process according to claims 2 or 3 wherein said alkali metal is cesium.

6. A process according to claim 1 wherein hydrogen is supplied with said charge to said contacting.

7. A process according to claims 1, 2 or 3 conducted at a temperature of about 700° to 800° F.

8. A process according to claims 1, 2 or 3 wherein said zeolite is zeolite ZSM-5.

9. A process according to claim 1 wherein said zeolite is in admixture with a metallic hydrogenation catalyst on a porous refractory support.

10. A process for converting a high boiling hydrocarbon charge fraction to liquid products of lower boiling range which comprises contacting said charge fraction with a crystalline zeolite characterized by a silica/alumina ratio greater than 12 and an acid activity measured by the alpha scale less than 10, said contacting being conducted at 650° to 850° F., space velocity of 0.1 to 5.0 LHSV and a pressure not less than about 200 psi.

11. A process according to claim 10 wherein the ion exchange sites of said zeolite are essentially occupied by alkali metal cations.

12. A process according to claim 11 wherein at least 0.5 weight percent of sulfur is included in the charge supplied to said contacting.

13. A process according to claims 11 or 12 wherein said alkali metal is sodium.

14. A process according to claims 11 or 12 wherein said alkali metal is cesium.

15. A process according to claim 10 wherein hydrogen is supplied with said charge to said contacting.

16. A process according to claims 10, 11 or 12 conducted at a temperature of about 700° to 800° F.

17. A process according to claims 10, 11 or 12 wherein said zeolite is zeolite ZSM-5.

18. A process according to claim 10 wherein said zeolite is in admixture with a metallic hydrogenation catalyst on a porous refractory support.

19. A process according to claim 1 or 10 wherein elemental hydrogen is admixed with said hydrocarbon charge fraction.

* * * * *